Feb. 18, 1969 M. HETZEL ET AL 3,428,937
DEVICE FOR SECURING A BATTERY IN A WATCH
Filed Sept. 20, 1966

United States Patent Office 3,428,937
Patented Feb. 18, 1969

3,428,937
DEVICE FOR SECURING A BATTERY IN A WATCH
Max Hetzel, Bienne, Henri Haring, Tavannes, and Henri Robert, La Chaux-de-Fonds, Switzerland, assignors to Centre Electronique Horloger S.A., Neuchatel, Switzerland, a corporation of Switzerland
Filed Sept. 20, 1966, Ser. No. 580,812
Claims priority, application Switzerland, Sept. 27, 1965, 13,332/65
U.S. Cl. 339—95         5 Claims
Int. Cl. H01r 11/00; G04c 3/00; H01m 1/04

ABSTRACT OF THE DISCLOSURE

This disclosure concerns a device for securing a wafer-type battery cell to the base plate of an electrical assembly, such as an electrical watch. The device consists of a conductive spring electrically connected to the assembly and secured on the base plate, the spring having two resilient arms, one having an insulated under surface pressing a conductor forming part of the electrical assembly against one pole of the battery and a second resilient arm pressing against the other pole of the battery. The spring may be mounted for movement relative to the battery so that when it is moved out of contact with the battery, the same can fall out by simply overturning the electrical assembly.

---

The present invention has for its object novel means for securing a wafer-type cell (that is one having approximately the shape of a cylinder the diameter of which is greater than the height), to an electric watch or to other small dimensioned apparatus.

In electric watches, the battery is generally secured in a cylindrical lodging in the plate of the watch, in which it is maintained by an elastic arm insulated from the battery, the contact between the envelope of the battery constituting the positive terminal thereof, and the ground being along the entire bottom of the lodgement. However, it has been noted that, with time, the contacting surfaces were subjected to oxidation deleterious to proper contact between the two parts.

The securing device according to the present invention obviates this drawback. It is characterised by the fact that it is constituted by a conducting spring secured to the ground and in electrical contact therewith, this spring being formed by a blade cut in such a way as to form two tongues, the first of which bears on the central part of the battery forming one of its terminals, while being electrically insulated thereform, while the second tongue has a sharp extremity exerting a strong pressure on the envelope of the battery (the other terminal), in such a way as to ensure a good electrical contact between the battery and the ground.

The annexed drawing represents by way of example two embodiments of the invention.

Figure 1:
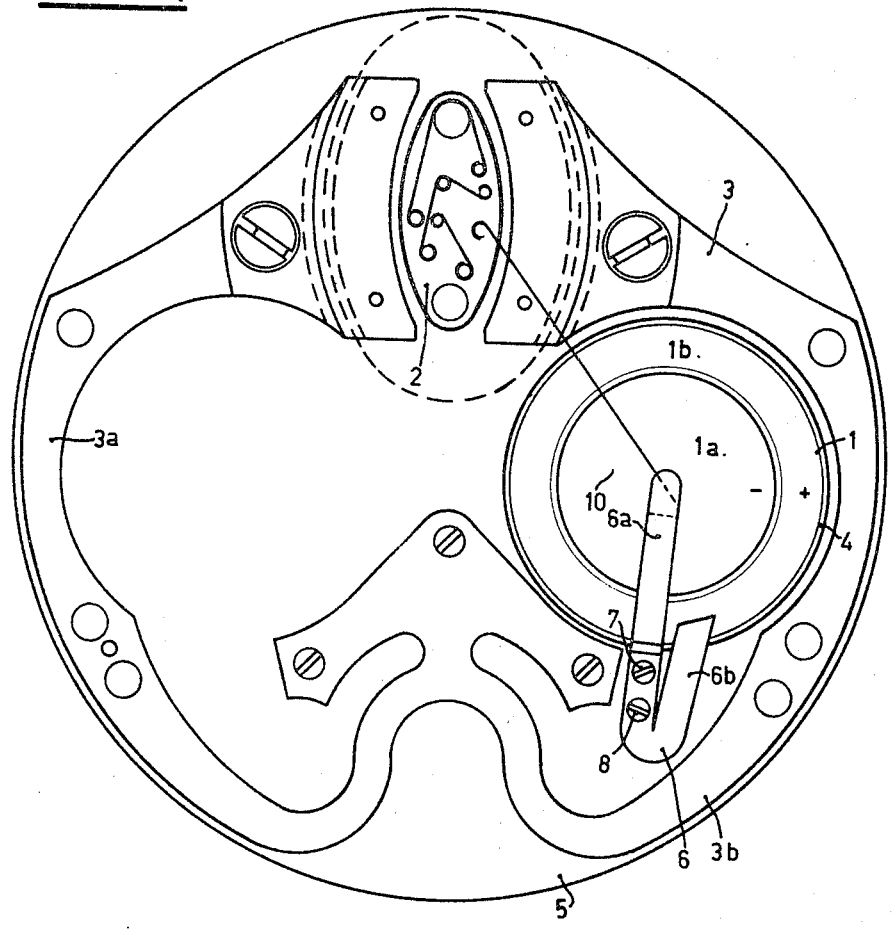
Figure 2:
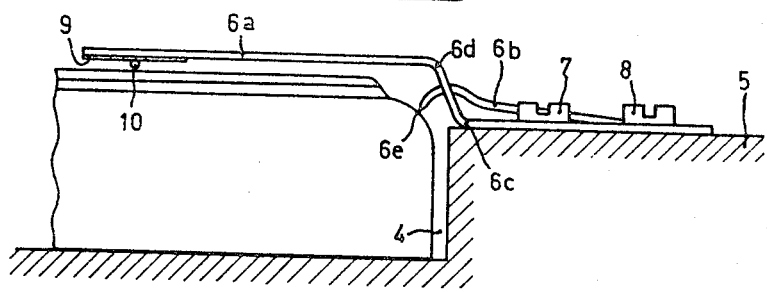
Figure 3:
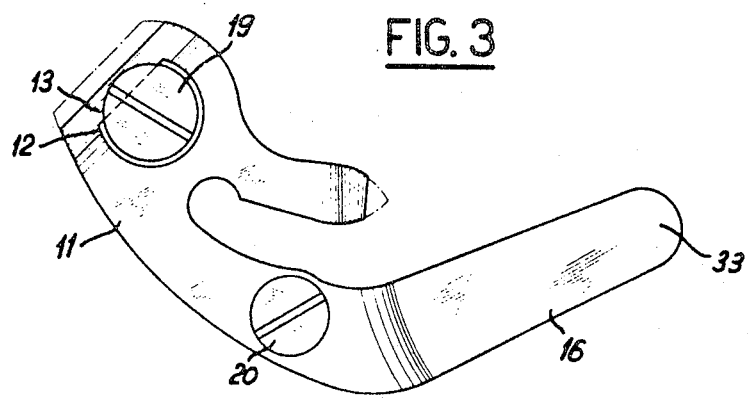
Figure 4:
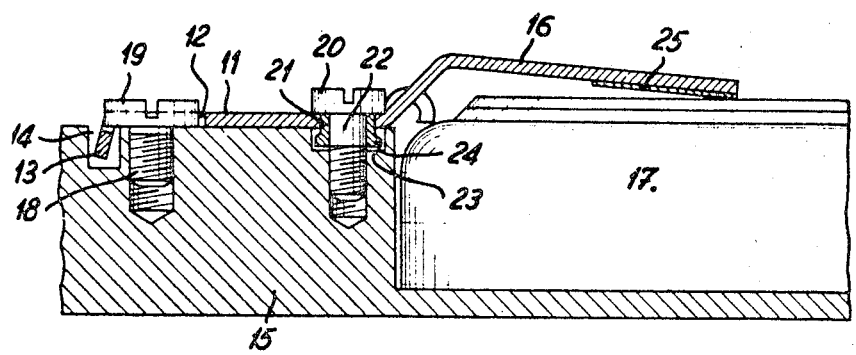

FIGURE 1 shows a plan view of FIGURE 2 and FIGURE 2 a partial elevational view of a first embodiment, while FIGURES 3 and 4 are a plan view and a cross-section, respectively, of a second modification.

In the example shown, battery 1 feeds the electric maintenance circuit 2 of the oscillator of an electromechanical watch the time base of which and the motor member of which consists of a symmetrical resonator 3 between the branches of which 3a and 3b is positioned the battery. Resonator 3 drives the gear train by means of a conventional gearing system which need not be shown and which occupies a space located between the battery and branch 3a of the resonator. Battery 1 is disposed in a lodging 4 provided in the plate 5. It is maintained therein by a spring 6 of stainless steel secured in the plate on the side of the lodging by means of two screws 7 and 8. The spring is cut longitudinally so as to provide two tongues 6a and 6b. Tongue 6a bent at two points 6c and 6d presses the central part 1a of the battery forming the negative pole thereof and solidly maintains the battery in place in its lodging. The lower face of the extremity of this tongue is covered by an insulating coating 9 for example of paper, of mica, enamel or other hard insulator and does no bear directly on the battery but squeezes the end of a conducting wire 10 of stainless steel linking the negative pole of the battery to circuit 2. The other tongue 6b is bent at its extremity which is shaped in such a way as to have a sharp edge 6e exerting a strong pressure on the envelope 1b of the battery forming the positive pole thereof, penetrating even lightly in this envelope, in such a way as to effect a good electrical contact between the envelope of the battery and the ground. This contact is not subject to oxidation.

Furthermore in the securing device, the dimensions of the battery can vary slightly without requiring any adjustment. However such a variation in the dimensions of the battery occurs frequently as a result of swelling.

It is clear that the shape of the spring is not limited to the shape represented in the drawing but that it can have any other shape suitable to the available space. In particular tongue 6b could bear against the side of the battery, the elastic pressure being assured by a folding of the tongue in the shape of an S, the end 6e still being perpendicularly directed against the surface of the cell container.

When the battery has to be changed, it is necessary to unscrew the two screws 7 and 8 and to decap spring 6. During this operation, there is danger of losing both the spring and the screws. Thus in the modification shown on FIGURES 3 and 4, means have been provided for avoiding such loss and furthermore for ensuring that during closing, the spring assumes by itself a correct orientation. In this modification, these ends are attained by very simple means.

The spring shown on FIGURES 3 and 4 is adaptable to a movement similar to that shown on FIGURE 1. The clip 11 for securing spring 16 to the plate has an opening 12 in the form of a closed U kept at the same time as the outer periphery of the spring. The rectilinear tongue 13 is folded downwardly to engage in a rectilinear groove 14, 15 (FIGURE 4). 14 is oriented in a direction which is a function of the orientation of tongue 13 in order that arm 16 of the spring points toward the centre 33 of battery 17.

A screw 18 the head of which 19 covers partially tongue 13 be rectilinear parts of the closed U-shaped opening clip 11 from leaving the plate, but permits its rotation around the axis of groove 14, acting as a hinge.

The head 19 of screw 18, slightly smaller than the circular part of the hole 12 positions clip 11 at the moment of its securing by screw 20. The latter remains imprisoned by the clip by means of a ring 21 force-fitted on body 22 of screw 20. A clearance 23 in plate 15 makes possible to place therein the retaining collar 24 of ring 21, which facilitate introduction and removal of screw 20.

The arrangement above described permits to remove the battery by simply turning over the movement after having previously unscrewing screw 20.

The battery then falls under the influence of its own weight.

The new battery is introduced then by maintaining the clip in its open position and then folding it over by rotating it round screw 18 and by screwing screw 20.

Arm 16 is shown in its operative position in FIGURE 4, and for that reason it penetrates into the bulk of battery 17. In practise, arm 16 will squeeze the contact wire between the negative terminal of the battery in the same manner as in the first modification, and spring 16 for this purpose will be covered by an insulating layer 25.

Suitably the stainless steel used for making the attachment according to the invention can be 18/8 steel.

What is claimed is:

1. Device for securing to the base plate of an electrical assembly, a wafer-type battery cell having an upper central surface constituting one pole thereof and a casing having an outer surface constituting the other pole, said device comprising a conductive spring secured to said base plate and electrically connected to said electrical assembly, said spring comprising a first resilient arm having insulating means on the underside thereof for pressing a conductor forming part of said electrical assembly against said upper central surface of said battery and a second resilient arm pressing against said outer surface.

2. Device according to claim 1, wherein said plate has a well for receiving said battery cell therein.

3. Device according to claim 1, wherein said second arm has a sharp point penetrating slightly in said outer surface of said cell.

4. Device according to claim 1, wherein said spring is of stainless steel.

5. Device according to claim 1, wherein said conductive spring is movably mounted on said plate so as to permit removal of said battery cell.

References Cited

UNITED STATES PATENTS

| | | | |
|---|---|---|---|
| 2,477,895 | 8/1949 | Pollock | 339—95 |
| 2,668,197 | 2/1954 | Gustafson et al. | 179—107 |
| 2,975,226 | 3/1961 | Lehr | 136—173 |
| 2,985,705 | 5/1961 | Smythe | 136—173 |

MARVIN A. CHAMPION, *Primary Examiner.*

JOSEPH H. McGLYNN, *Assistant Examiner.*

U.S. Cl. X.R.

58—23; 136—173